US008676691B2

(12) United States Patent
Schiller

(10) Patent No.: US 8,676,691 B2
(45) Date of Patent: Mar. 18, 2014

(54) SYSTEM, REPORT, AND METHOD FOR GENERATING NATURAL LANGUAGE NEWS-BASED STORIES

(71) Applicant: Victor Hugo Schiller, Crozet, VA (US)

(72) Inventor: Victor Hugo Schiller, Crozet, VA (US)

(73) Assignee: O2 Media LLC, Charlottesville, VA (US)

( * ) Notice: Subject to any disclaimer, the term of this patent is extended or adjusted under 35 U.S.C. 154(b) by 0 days.

(21) Appl. No.: 13/943,383

(22) Filed: Jul. 16, 2013

(65) Prior Publication Data

US 2013/0305148 A1    Nov. 14, 2013

Related U.S. Application Data

(63) Continuation of application No. 12/973,576, filed on Dec. 20, 2010, now Pat. No. 8,494,944, which is a continuation-in-part of application No. 12/134,007, filed on Jun. 5, 2008, now Pat. No. 7,856,390.

(60) Provisional application No. 60/942,356, filed on Jun. 6, 2007.

(51) Int. Cl.
*G06Q 40/00* (2012.01)
*G06Q 40/06* (2012.01)

(52) U.S. Cl.
CPC ........................... *G06Q 40/06* (2013.01)
USPC .............. 705/36; 705/35; 707/769; 707/737; 707/700; 713/156; 704/9; 709/202; 715/234

(58) Field of Classification Search
USPC ............. 705/35; 707/769, 737, 700; 713/156; 704/9; 709/202; 715/234
See application file for complete search history.

(56) References Cited

U.S. PATENT DOCUMENTS

| | | | |
|---|---|---|---|
| 6,078,924 A * | 6/2000 | Ainsbury et al. | 1/1 |
| 6,205,456 B1 * | 3/2001 | Nakao | 715/201 |
| 6,408,282 B1 * | 6/2002 | Buist | 705/36 R |
| 6,583,794 B1 * | 6/2003 | Wattenberg | 715/708 |
| 7,430,532 B2 * | 9/2008 | Wizon et al. | 705/36 R |
| 7,475,032 B1 * | 1/2009 | Patnode et al. | 705/36 R |
| 7,979,786 B1 * | 7/2011 | Hull et al. | 715/202 |
| 2001/0051904 A1* | 12/2001 | Nishimura | 705/27 |
| 2001/0051907 A1* | 12/2001 | Kumar et al. | 705/36 |
| 2002/0010697 A1 | 1/2002 | Marshall et al. | |

(Continued)

*Primary Examiner* — Tien Nguyen
(74) *Attorney, Agent, or Firm* — Vedder Price P.C.

(57) ABSTRACT

The present invention generally relates to a system, report, and method for automatically generating a series of natural language news-based stories to be presented via a digital interface or printed publication to a portfolio user. The disclosure relates to a filter or selection of a handful of relevant and desired financial instruments, or events created in a large group of events such as sports results, travel information, auction related data, online shopping tools, social media, retail store promotion generation, search engine daily report, etc. for a specific use. These financial instruments, based on different selections from a portfolio manager via a management tool, are then used to either produce a strategies page where a list of useful covered call trade and hedged trade are displayed in the form of a table, or natural language news-based stories relating to a selected list of financial instruments found in a portfolio. The events are based on different selections from a portfolio manager via a management tool and are then used to either produce a secondary page where a list of the selected event data is displayed or natural language news-based stories relating to a selected list of events found in a portfolio from a large event database.

12 Claims, 9 Drawing Sheets

(56) References Cited

U.S. PATENT DOCUMENTS

| | | |
|---|---|---|
| 2002/0133447 A1 | 9/2002 | Mastman |
| 2002/0152245 A1* | 10/2002 | McCaskey et al. ........... 707/530 |
| 2002/0174056 A1 | 11/2002 | Sefein et al. |
| 2002/0184237 A1 | 12/2002 | McFeely |
| 2002/0188543 A1 | 12/2002 | Wizon et al. |
| 2002/0188635 A1 | 12/2002 | Larson |
| 2003/0110106 A1 | 6/2003 | Deshpande et al. |
| 2003/0135445 A1 | 7/2003 | Herz et al. |
| 2003/0187772 A1 | 10/2003 | Papka |
| 2003/0233309 A1 | 12/2003 | Matus et al. |
| 2004/0153333 A1 | 8/2004 | Oshima et al. |
| 2005/0080820 A1 | 4/2005 | Koppel et al. |
| 2005/0144109 A1 | 6/2005 | Boni et al. |
| 2005/0165638 A1 | 7/2005 | Piller |
| 2005/0203970 A1 | 9/2005 | McKeown et al. |
| 2005/0278623 A1 | 12/2005 | Dehlinger et al. |
| 2006/0020538 A1 | 1/2006 | Ram et al. |
| 2006/0026088 A1 | 2/2006 | Grossman et al. |
| 2006/0190384 A1 | 8/2006 | Gurley et al. |
| 2006/0235786 A1 | 10/2006 | DiSalvo |
| 2007/0005481 A1 | 1/2007 | Kedia et al. |
| 2007/0156669 A1 | 7/2007 | Marchisio et al. |
| 2007/0203816 A1 | 8/2007 | Costache et al. |
| 2007/0260586 A1 | 11/2007 | Savona et al. |
| 2008/0097830 A1 | 4/2008 | Kim |
| 2009/0282338 A1* | 11/2009 | Bohms .......................... 715/719 |

* cited by examiner

Investors Observer Automatic Portfolios Management Tools

Select Option Strategies Page

```
 ┌101
[Analysts Favorites  ▼]  [View Page]
[Analysts Favorites]
[Momentum Plays]          bols for this strategy.
[Hedged Dividend Income]  to enter anything here if you want to follow S&P's outlook for the stock. But if you want the trades
[Stocks In The News]      stock enter a "+", "++", "+++", or "++++" here if you are bullish and want out-of-money trade
ideas for these stocks. More "+" signs mean more bullish and the sold options will be farther out of the money. If you are bearish
on a stock you can enter "-", "--", "---", or "----".
```

Sold Call Option Symbol - If you want a specific sold call option symbol used.
Exclude From List - Place a check mark in this column for stocks you do not want to use for the strategies.

| Stock Symbol 104 | Push Factor (+, ++, +++, ++++, +++++ or -, --, ---, ----) | Sold Call Option Symbol | Exclude From List | News Line ┌109 | Delete Stock From List |
|---|---|---|---|---|---|
| AAPL | ++ |  | ☐ ┌102 |  | ┌102 Delete AAPL |

70 Total Stocks In List.

Add stocks to the list [ ┌103 ] [Add Stocks]
(Enter stocks with a comma after each then click [Add Stocks])

┌113                          ┌114
[Submit Change]  [Recover Default Values For Today]  (use this button to reset the table above)

┌111
[Click Here To Preview Strategies Page]
(Note: After you click the button it could take several minutes to generate the trades)

Note: Strategies based on these stocks will not be displayed on the live web page until after 8PM Eastern Time. If you would like the live web page updated now use the button below.

┌112
[Click Here To Update Live Web Page Now]

┌115
[Click Here To Generate News Stories Now]    FIG. 5

Investors Observer Automatic Portfolios Management Tools

Select Option Strategies Page

[Stocks In The News ▼] [View Page]

Stock Symbol - The stock symbols for this strategy.
Push factor - You do not need to enter anything here if you want to follow S&P's outlook for the stock. But if you want the trades to reflect your outlook for the stock enter a "+", "++", "+++", or "++++" here if you are bullish and want out-of-money trade ideas for these stocks. More "+" signs mean more bullish and the sold options will be farther out of the money. If you are bearish on a stock you can enter "-", "--", "---", or "----".
Sold Call Option Symbol - If you want a specific sold call option symbol used.
Exclude From List - Place a check mark in this column for stocks you do not want to use for the strategies.

| Stock Symbol | Push Factor (+, ++, +++, ++++, +++++ or -, --, ---, ----, -----) | Sold Call Option Symbol | Exclude From List | News Line | Delete Stock From List |
|---|---|---|---|---|---|
| AMLN | - | | ☐ | The stock dropped 6.72% in trading yesterday as | Delete AMLN |
| AMR | - | | ☐ | The stock fell 4.85% yesterday in a sinking | Delete AMR |

FIG. 6

InvestorsObserver.com
Better Strategies For Making Money
For Investors with a Sense of Humor Home | Login | About Us | First Month for $1 | Free InvestorPerks Signup | Special Reports | Help | Contact Us

Stocks In The News

Covered Call Trade Summary Table:

| Trade Date | Stock Symbol | Sell Option | Sell $ | Net Debit (Break Even) | %Downside Protection | Assigned Return Rate | % In The Money | Expiration Date |
|---|---|---|---|---|---|---|---|---|
| 6/6/2007 | AMLN 3 STAR (43.52) 43.00 | CALL AQM AH Jan '08 | 8.50 | 35.12 | 19.49% | 13.9% 22.34%* Annualized +0% An Div Rate | 6.3% | 1/19/2008 227 Days 0¬0¬0¬ Moderate Relative Risk |
| CRAY - No Trade Available For Stock Symbol | | | | | | | | |
| 6/6/2007 | D 4 STAR (87.87) 87.08 | CALL D JR Oct '07 90.00 | 3.10 | 84.77 | 3.53% | 6.17% 16.56%* Annualized -3.2% An Div Rate | -2.42% | 10/20/2007 136 Days 0¬0¬0¬0¬ Low Relative Risk |

Hedged Trade Summary Table:

| Trade Date | Stock Symbol | Buy Option | Sell Option | Net Debit | Break Even | % In The Money | # of Cont. | Total Debit | Target Return | Return Rate | Near Term Expiration Date |
|---|---|---|---|---|---|---|---|---|---|---|---|
| 6/6/2007 | AMLN 3 STAR (43.62) 43.00 | CALL AQM AF Jan '08 30.00 15.80 | CALL AQM AH Jan '08 40.00 8.50 | 7.30 | 37.30 14.49% DnSd Prot | 0.3% | 10 | 7,300 | 2,700 | 36.99% 59.47%* Annualized | 1/19/2008 227 Days 0¬0¬ Considerable Relative Risk |
| CRAY - No Reasonable Trade Available For Stock Symbol | | | | | | | | | | | |

NOTE:
If an "*" is shown for the S&P STAR Rating then the stock is not covered by S&P
* Annualized Returns for Comparison Purposes only
** Stock price at expiration of sold option or at time of closing trade
Analysts comments and news on these stocks...
AMLN...The stock dropped 6.72% in trading yesterday as the company announced it intends to sell $400 million of convertible senior notes, expected to be due in 2014.
CRAY...The stock dropped 9.43% yesterday as Thomas Weisel Partners is lowered its estimate for the company to 0.38 from 0.41.
D...The stock was up 0.26% yesterday as the company revealed that it agreed to divest most of its exploration and production businesses for about $6.5 billion in two separate transactions before the end of August.

FIG. 8

SYSTEM, REPORT, AND METHOD FOR GENERATING NATURAL LANGUAGE NEWS-BASED STORIES

CROSS-REFERENCE TO RELATED APPLICATION

This application is a Continuation and claims the benefit of and priority from U.S. Non-Provisional patent application Ser. No. 12/973,576, filed on Dec. 20, 2010. U.S. patent application Ser. No. 12/973,576 is a Continuation-in-Part and claims the benefit of and priority from U.S. Non-Provisional patent application Ser. No. 12/134,007, filed on Jun. 5, 2008, now issued as U.S. Pat. No. 7,856,390 on Dec. 21, 2010, and U.S. Provisional Patent App. No. 60/942,356, filed on Jun. 6, 2007, which applications are expressly incorporated herein by reference.

FIELD OF THE INVENTION

The present disclosure generally relates to a system, report, and method for automatically generating a series of natural language news-based stories by a portfolio manager for any of financial instruments, or events created in a large group of events such as sports results, travel information, auction related data, online shopping tools, social media, retail store promotion generation, search engine daily report, etc. using a news brief entered by the portfolio manager, and more precisely, to the automatic creation of natural language news-based stories relating to a selected list of financial instruments or events found in a portfolio.

BACKGROUND

With the arrival of online electronic communication, the floodgates to all manner of content have opened. This content rapidly becomes overwhelming if unmanaged. Users and information service providers must learn to distinguish between useful information and useless information in this digital sea of information. This problem is compounded when little or no reaction time is available to distinguish between useful and useless information. For example, the trade of financial instruments, such as stocks, bonds, and option contracts, requires constant updates of the positions of each financial instrument in the marketplace. Other examples include the generation of sport results and data when a user has already selected a handful of favorite teams of interest, information on travel data from selected known locations and hotels, the generation of automated daily recap of items on a wish list in an auction, the selection of some retail product families of interest for online shopping web sites, a daily activity breakdown of friends posts on social media, the automatic daily report on search engines for specific topics, or even sending the right promotions by brick and mortar stores who receive marketing promotions online.

The value of these financial instruments, generally grouped into sectors, categories, or portfolios when associated with a private or corporate entity, evolves constantly. With globalization and international relationships between corporations, a hurricane occurring overnight in the Philippines can impact stock values of a corporation engaged in, for example, the sale of camping equipment.

For this reason, portfolio managers and owners of financial instruments generally must be on the lookout for information relevant to their holdings, be it likely to have a positive, neutral, or negative impact the values of their instruments. One method of meeting this need is to employ the services of brokerage firms or brokers specialized in financial instruments. Because of the large diversity of instruments on the market, brokers often serve as intermediaries to in-house experts in a specific field. As a result, if a portfolio owner owns one utility stock, a covered call stock of a mining stock, and an international stock, the broker serves as the go between and compiles the needed information for the client. The time needed for active brokers to provide important information to clients is often too great to allow for the information to maintain its usefulness.

Another method involves the ongoing review of news briefs and reading specialized online or paper-based publications in search of relevant information. This method rapidly turns into a fishing expedition when relevant data must be extracted from a wide variety of news sources. Once again, the time associated with the collection, compilation, and review of available data to distil the relevant information renders this method quite unsatisfactory.

Finally, a recent method corresponds to the online creation by portfolio users of a list of financial instruments at a website where a large database of information can be accessed. Each stock is given a hyperlink that can be clicked when information on the stock is desired. This method requires users to be constantly on the lookout for new information and is time consuming. What is needed is an automated method available for portfolio managers and experts for providing portfolio users and owners easy-to-understand news briefs relevant to their financial instruments in an expedited and efficient way. What is also needed is an automated method and system for portfolio managers of selected topics in information from a large event database to receive only easy-to-understand news briefs relevant to the topics selected.

BRIEF DESCRIPTION OF THE DRAWINGS

The features of the present disclosure are believed to be novel and are set forth with particularity in the appended claims. The disclosure may be best understood with reference to the following description taken in conjunction with the accompanying drawings. Figures that employ like reference numerals identify like elements.

FIG. 5 is an option strategies page from an online system for automatically generating natural language news-based stories relating to financial instruments held in a portfolio are produced including a header according to an embodiment of the present disclosure.

FIG. 6 is the option strategies page of FIG. 5 where a news brief is inserted in the news line item according to another embodiment of the present disclosure.

FIG. 8 is an Internet display of the strategies page produced by the system shown in FIG. 3 according to another embodiment of the present disclosure.

SUMMARY

Figure 1:
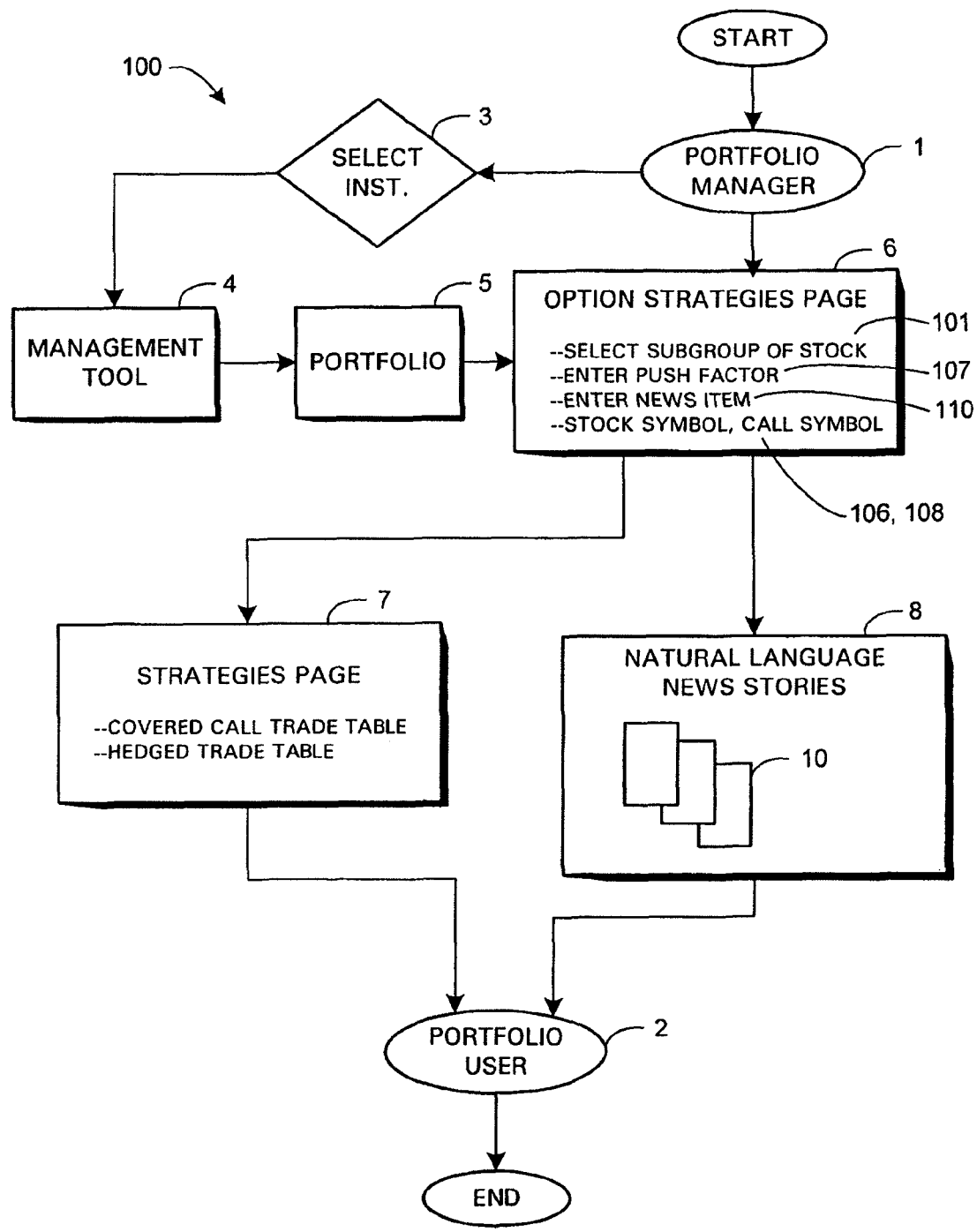
FIG. 1 is a schematic diagram of the method for generating natural language news-based stories relating to financial instruments held in a portfolio according to a first embodiment of the present disclosure.

The present invention generally relates to a system, report, and method for automatically generating a series of natural language news-based stories to be presented via a digital interface or printed publication to a portfolio user. The disclosure relates to a filter or selection of a handful of relevant and desired financial instruments, or events created in a large group of events such as sports results, travel information, auction related data, online shopping tools, social media, retail store promotion generation, search engine daily report, etc. for a specific use. These financial instruments, based on different selections from a portfolio manager via a management tool, are then used to either produce a strategies page where a list of useful covered call trade and hedged trade are displayed in the form of a table, or natural language news-based stories relating to a selected list of financial instruments found in a portfolio. The events are based on different selections from a portfolio manager via a management tool and are then used to either produce a secondary page where a list of the selected event data is displayed or natural language news-based stories relating to a selected list of events found in a portfolio from a large event database.

DETAILED DESCRIPTION

The present invention is not limited to the particular details of the system, report, or method depicted, and other modifications and applications may be contemplated. Further changes may be made in the above-described system, report, and method without departing from the true spirit of the scope of the invention herein involved. It is intended, therefore, that the subject matter in the above depiction should be interpreted as illustrative, not in a limiting sense.

Within the scope of this disclosure, the term "financial instrument" in the broad sense represents all and every traded instrument and includes, for example, cash, stocks, bonds, treasury bonds, options contracts, loans, bond futures, interest rate swaps, interest rate options, bills, commercial paper, deposits, certificates of deposits, short-term interest rate futures, forward rate agreements, exotic instruments, equity futures, spot foreign exchange, currency futures, foreign exchange options, ownership interest, or any and all other instruments that can be traded.

One embodiment of the present invention generally relates to a system 100, report, and method for automatically generating 8 a series of natural language news stories 10 directed to financial instruments named and found in a portfolio and managed by a stock portfolio manager 1. The stock portfolio manager engages in the selection of stocks 3 using a management tool 4 to modify the portfolio of financial instruments 5 at an option strategies page 6 or directly enters information at the option strategies page 6.

FIG. 1 is a schematic diagram of the method 100 for generating natural language news-based stories 8 relating to financial instruments held in a portfolio 5 according to a first embodiment of the present disclosure. The schematic diagram is provided for convenience and comprehension purposes with start and end buttons placed respectively at the top and the bottom the diagram. Single-direction arrows are also shown to further improve comprehension. While a series of steps is shown in a specific order with associated arrows indicating a specific arrangement, what is in fact contemplated and disclosed is the use of the steps shown, arranged in a plurality of different configurations, with arrows oriented accordingly in order to allow a portfolio manager 1, such as a writer, a technical writer, or other author, to provide the information to the portfolio user 2, including a series of natural language news stories 10 created from data assembled from other sources.

FIG. 1 shows how a portfolio manager 1 can select financial instruments 3 in order to manage 4 a portfolio 5. Some management tools are shown in the options strategies page 6 shown in FIG. 5, where a drop-down menu 101 allows a portfolio manager 1 to select groups or subgroups of financial instruments associated with predefined criteria. In another embodiment, portfolio managers 1 can use boxes or buttons 102 to delete or exclude from the list certain stocks. FIG. 5 shows how another contemplated management tool 4, such as an add stock box 103, can be used to add specific stocks or financial instruments to the list. One of ordinary skill in the art recognizes that while one possible embodiment of portfolio 5 management 4 is shown, what is known and contemplated is the use of any software interface where stocks can be managed in a portfolio 5, including but not limited to drag-and-drop interfaces, icon-based systems, and even elements equipped with artificial intelligence algorithms.

Once the portfolio manager 1 has selected or changed a specific portfolio 5 using the management tool 4, the group of financial instruments and associated information is presented. FIG. 5 shows one such interface where the portfolio manager 1 is presented the information in the form of a table with each stock shown on a different row 104 of the table. On each row 104, the financial instrument include columns such as a symbol 106, a push factor associated with the stock 107, a sold call option symbol 108, a news window 109, and a delete stock from list button 102. FIG. 6 is an example of certain stocks (AMLN, AMR) where the news window 109 is filled with a news item 110.

In one embodiment shown in FIGS. 5 and 6, the user has the default option of using as a push factor 107 the S&P outlook of the financial instrument. One of ordinary skill in the art recognizes that while one leading stock outlook indicator is given as the default option, any indicator can be used and is contemplated. What is also contemplated is the use of an indicator made of a series of plusses "+" or minuses "−" used as "++++" for the most favorable outlook possible and "−−−−" as the least favorable outlook possible on the stock. This outlook is then incorporated as information relevant to the stock and associated with the production of the natural language news stories 10 at a later step of the above described system, report, and method. What is shown and described is only one possible embodiment where an option strategies page 6 with subgroups of stocks, push factors, news items, and stock symbols/call symbols are shown.

In a subsequent step, either a strategies page 7 is created or a natural language news stories 8 is created for a portfolio user 2. The creation of the strategies page 7 made of a covered call trade table and a hedged trade table as shown in FIG. 8 is fully described in the U.S. patent application Ser. No. 11/556,031 filed on Nov. 2, 2006, entitled SYSTEM, REPORT, AND COMPUTER-READABLE MEDIUM FOR ANALYZING A STOCK PORTFOLIO, which application is hereby fully incorporated herein. FIG. 5 also shows other tools, such as a preview button 111 to produce the strategies page 7 shown in FIG. 8 based on the portfolio 5 selected by the portfolio manager 1 in the option strategies page 6. FIG. 5 also shows a function where the strategies page 7 can be displayed on a webpage. The system shown in FIG. 5 comprises a first button 112 to update the generated live webpage, a second button 113 to submit the changes, a third button 114 to reset default values of the page once it has been changed using the second button 113, and finally, a fourth button 115 to generate a series 8 of natural language news stories 10. A sample printout of the series 8 of natural language news stories is shown in FIG. 4.

Figure 4:
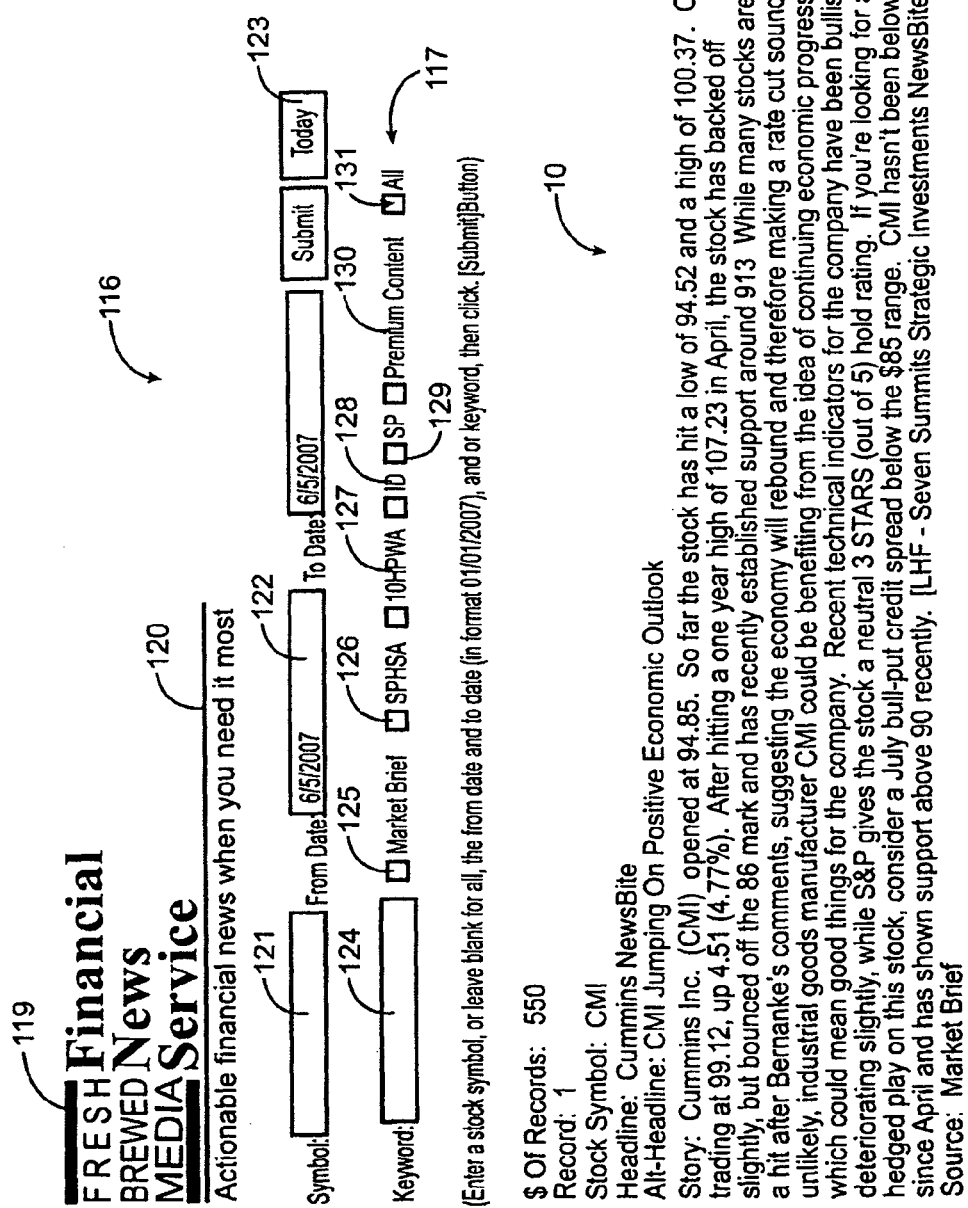
FIG. 4 is a financial news service printout from an online system for automatically generating natural language news-based stories relating to financial instruments held in a portfolio are produced including a header according to an embodiment of the present disclosure.

FIG. 4 is a single website generated on the Internet and shows a sample header 116 and search tool 117 for news stories 10 placed directly above the news stories window 118. The header shown in FIG. 4 includes a trademark 119, a slogan 120, and a search tool 117. The search tool 117 in the contemplated embodiment can index the different news stories 10 by symbol 121, by date issued 122, on a daily basis 123, with user-selected keywords 124, or with other specific keywords such as market brief 125, SPHSA 126, IOHPWA 127, IP 128, SP 129, premium content 130, or the selection of all news stories 131. One of ordinary skill in the art recognizes that while a handful of search tools are provided to a portfolio user 2, any combination or variation of search tools is contemplated.

Figure 2:
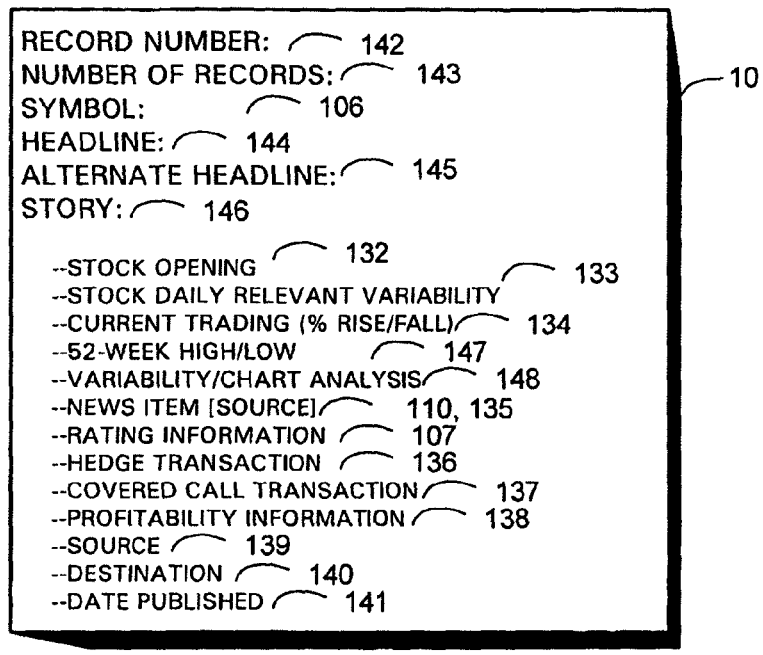
FIG. 2 is a schematic diagram of the an automatically generated natural language news-based story as shown in FIG. 1.
Figure 7:
FIG. 7 is a webpage illustration of portions of the news report produced by the system shown in FIG. 3 according to another embodiment of the present disclosure.

FIG. 2 illustrates one natural language news story 10 generated from a specific stock from the option strategies page 6. In the natural language programming tool, what is contemplated is the use of information, such as stock opening data 132, daily stock relevance variability 133, current trading or variations in percentages 134, a 52-week high and low for the stock 147, a variability chart analysis 148, a news item along with the source 135, rating information 107, an optimal hedge transaction 136, a covered call transaction 137, profitability information 138, a source 139, a destination 140, a date published 141, and a header including an individual record number 142, a total number of records 143, the stock symbol 106, a headline 144, an alternate stock headline 145, and a story header 146. This news stories 10 format is illustrated in FIG. 4. FIG. 7 illustrates another possible embodiment of the present display of news stories having another format where the date published is used as a principal indexing tool.

In the field of stock analysis, individual stock news stories are created rapidly and may be classified by financial instruments of interest, field of interest, or other parameter. A first analysis might focus on all stocks in the mining industry while another stock analysis might focus on news relating to all stocks starting with a specific letter of the alphabet. When a new news item 110 is released, such as, for example, relevant tax issues, corporate governance, change in geopolitical situation, etc., the stocks capacity to be influenced by this news must be noted. A service associates the news item 110 with different corporations relevant to the news item 110. An author then reviews the stock position and manually associates the current stock information to the news item 110. For example, if the French government enacts a law against the music player iPod, holders of the stock MAC must be notified. Before this disclosure, an in-house analyst would collect the MAC stock-related position, conduct costly and time-consuming research, and associate them to the news item 110, the 52-week high, the 52-week low, and other relevant issue. Because this service is sold to clients, the creation of a uniform, boilerplate, computer-generated story is impractical and has reduced readability. What is contemplated is the use of a news-generating algorithm with sentence and paragraph reconstruction to simulate natural language. In one contemplated embodiment, syntax and grammar rules are devised to emulate man-made text. In another contemplated embodiment, keywords are merged into a bank of predefined and variable sentences and paragraph templates to simulate man-made text. By way of example, as shown in FIG. 4, the information of a 52-week high of $107.24 in April 2007, a 52-week low of $86 in May 2007, and a chart analysis of a technical support at $90 would be given as something like the following: 52-Week High: $107.24—Apr. 27, 2007; 52-Week Low: $86.65—May 2, 2007; Technical Support: $90.34. This dry construction is of limited utility in the form of a news item.

The use of basic grammar and paragraph construction methods provides the same information to customers in the form of basic sentences such as the following: The 52-week high was $107.24 reached on Apr. 27, 2007; the 52-week low of $86.65 was reached on May 2, 2007; and technical support of $90.34 is noted. Either a human author or computer software is capable of merging this information, removing irrelevant data, conforming dates for convenience and consistency, such as creating a series of boilerplate sentences to be repeated in a round-robin method, to produce the following sentence: "After hitting a one-year high of $107.23 in April, the stock has backed off slightly, but bounced off the 86 mark and has recently established support around 90." The commercial advantages of this last version are very important in an field where information synthesis is as important as information disclosure. For example, a calculated support is approximate and based on linear extrapolation methods. A support value of 90 is sufficient for a stock that moves between $86 to $107 but would be insufficient for a stock that moves between $89.75 and $91.00.

Figure 3:
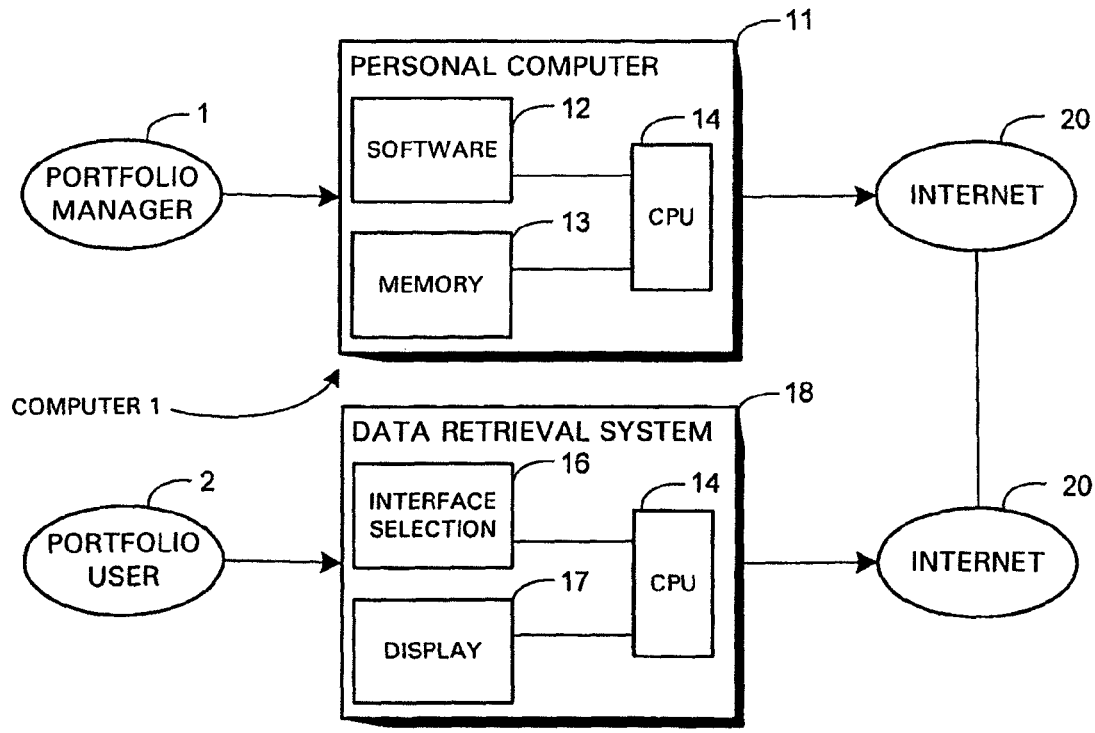
FIG. 3 is an overview of the system for generating natural language news-based stories relating to financial instruments held in a portfolio according to another embodiment of the present disclosure.

This disclosure contemplates all known methods of implementing on a central processor unit 14 as shown in FIG. 3 using software 12 having a method of creating natural language from text that may not be in, for example, full and complete sentences. What is also contemplated is the use of a large quantity of templates with input variables where a data field can be completed. In the above example, one possible template designed for a case where the one-year high is reached before the recent low with an intermediate support: "After hitting a one-year high of [52-week high] in [month and year], the stock has backed off [calculate variation adjective on parsed table] but bounced off the [52-week low] mark and has recently established support [$ value of support only if previous values more distant than $3, otherwise decimals]." In yet another embodiment, an additional parsing table is used to vary the terms within the sentence. By way of example, the term "slightly" could be used when the variation from the 52-week low is less than 3%, the term "mildly" could be used when the variation reaches 6%, and so on.

FIG. 3 shows a functional diagram of the automatic natural language news story generating system as physically embodied according to a first embodiment of the present disclosure. In one contemplated embodiment, the portfolio manager 1 uses a first personal computer 11 of any type or technology to conduct the above-defined operations and steps. The personal computer 11 is made of a central processing unit 14 functionally connected to software 12 designed to operate in tandem with the memory 13 in order to execute the software 12 in memory 13 and produce a tangible result. The personal computer 11 is connected to an Internet 20 known as an international network of a fixed protocol for data communication. A second data retrieval system 18, such as but not limited to another computer, a handheld device, a wireless telephone, or any other device where a central processing unit is connected functionally with an interface 16 and a display 17 is connected as shown on the Internet. The portfolio user 2 enters a command on the interface 16, which is then processed by the CPU 14 and sent via the Internet or other communication network to the personal computer where the information is collected and returned to the data retrieval system for display 17.

What is also contemplated is an automatic natural language news story generating system 100 from a stock portfolio including a personal computer 11 connected to an Internet 20 with a memory 13 and a central processing unit 14 in functional communication with the memory 13 and software 12 executed by the central processing unit 14. The software 12 executing an option strategies page 6 for entry by a portfolio manager 1 of a series of news items 110 associated to a series of selected financial instruments 3, and at least a related information for each of the selected financial instrument from the series of selected instruments in the portfolio 5. The system also includes a data retrieval system 18 connected to the Internet 20 in data connection with the computer 11, with a portfolio user interface 16, a central processing unit 14 connected to the user interface 16, and a display 17. The software 12 generates a natural language news story 10 based on the news item 110 and stock-related information for one of the series of selected stocks, wherein the data retrieval system 18 retrieves the natural language news story 10 from the personal computer 11 via the Internet 20 for display 17.

In a method for generating natural language news-based stories 10 directed to financial instruments named in a portfolio 5, the method includes the steps of selecting a portfolio of financial instruments 3 using a computer interface shown at FIG. 2 and offering a choice on the computer interface 12 between creating a strategies page 7 or a news stories page 8 produced from each of the financial instruments in the portfolio 5, wherein the news stories page 8 includes a plurality of natural language news stories 10, each including a date of publication 141, a story 146 rewritten in natural language using a template from a news brief 110, 135, and a source of origin 139 for the news brief.

In another embodiment, the first step of this method is preceded by the step of using a management tool 4 to define the portfolio 5. In another embodiment, the step of using the management tool 4 includes selection of financial instruments from a group of predefined choices 101 consisting of analyst favorites, momentum plays, hedged dividend income, stocks in the news, manual selection 103, related news line items 109, or stocks with a common push factor 107 as shown in FIG. 5.

FIG. 2 shows how the news brief (i.e., the story 146) is selected from a group consisting of a stock opening value 132, a daily variability of a financial instrument 133, a current trading expressed in percentage of rise or fall 134, a 52-week high value 147, a 52-week low value 147, a variability analysis data 148, a chart analysis data 148, a news item 110, 135, a rating 107, a hedge transaction 136, a covered call transaction 137, or profitability data 138. While a handful of possible news briefs 146 are shown, one of ordinary skill in the art recognizes that any newsworthy item associated with the trade and investment of financial instruments is contemplated.

In another embodiment, the step of using the management tool 4 includes the step of selecting from a group consisting of submitting changes to a defined portfolio table 113, recovering daily default values for the portfolio table 114, or updating live webpages 112 as shown in FIG. 5. FIG. 4 also shows a situation where each of the plurality of natural language news stories 10 include a header 116 or shown as a header on FIG. 2, selected from a group consisting of a record number 142, a number of records 143, a stock symbol 106, a headline 144, or an alternate headline 145.

In another embodiment a news report can be produced and comprises natural language news-based stories 10 relating to financial instruments 3 held in a portfolio 5. Each story 10 can includes a date of publication 141, a story 146 rewritten in natural language using a template (not shown but described) from a news brief, a source for the news item 139, and a header 116.

The news report can also be produced in the form of a webpage to be displayed on a computer screen or in the form of a computer file. This report can also be generated at the request of a portfolio user 2 based on the portfolio 5 as defined and updated using a management tool 4 by a portfolio manager 1. In another embodiment, the report is generated at the request of a portfolio manager 1 using a management tool 4 to select financial instruments 3 in the portfolio 5.

Finally, in yet another embodiment, the disclosure relates to a system 100 for generating natural language news-based stories 10 relating to financial instruments held in a portfolio 5. The system as best shown in overview in FIG. 3, where a computer 11 is connected to an Internet 20, the computer 11 comprising a memory 13 and a central processing unit 14 in functional communication shown by lines with the memory 13, and a software 12 executed by the central processing unit 14 in the memory 13. The software 12 selectively executes either a strategies page 6 or a news report 8 with a plurality of natural language news stories 10 for a plurality of financial instruments held in a portfolio 5.

The system 100 further includes a data retrieval system 18 connected to the Internet 20, the system 18 having a data connection with the computer 11. The data retrieval system 18 also includes a user interface 16, a central processing unit 14 connected to the user interface 16, and a display 17, wherein the software 12 located on the personal computer 11 generates the news report 10 based on a news brief for a plurality of financial instruments in the portfolio 5, and wherein the data retrieval system 18 retrieves either the strategies page 7 or the news report 10 from the personal computer 11 via the Internet 20 for display to the portfolio user 2. While FIG. 3 illustrates what can be seen as two different work stations located at two different locations with two different functions, what is contemplated is the use of one or more personal computers 11 along with any and all data retrieval system 18 to perform the described system.

FIGS. 9 to 12 show embodiments of the system, report, and method for generating natural language news-based stories that covers news originating from a wide range of fields where bulk data in mostly numerical format is created and in a subsequent step requires extensive work to process to a user and the user interface.

In many fields, for example is sports journalism, thousands of teams play and create statistics on a routine basis. Sports fans can go online and via an interface, such as a management tool 503 will select 502 from a wide nationwide group of teams and event data 501 a small group of sports team they want to receive data and news on. This is not unlike getting information only on a selected number of corporation for whom a person owns a stock in a stock portfolio. Other examples include information on travel data from selected known locations and hotels, the generation of automated daily recap of items on a wish list in an auction, the selection of some retail product families of interest for online shopping web sites, a daily activity breakdown of friends posts on social media, the automatic daily report on search engines for specific topics, or even sending the right promotions by brick and mortar stores who receive marketing promotions online.

Returning to FIG. 9, the teams or any other events form a portfolio 504 and at step 505, the engine will draw the data from the events data 501 based on the content of the portfolio 504. For a second example, if a user on an auction website desires to follow the price for a car, a house, and a BBQ, the auction site event data 501 can hold all information relating to all of the goods sold at the auction, while the management tool 503 will allow the selection 502 of only the three items of interest and then create a portfolio 504 of selected items of interest. The data for these three topics 1005 or subgroup 1009 as shown at FIG. 10 is then pulled at 505 from the all events data database 501.

Figure 9:
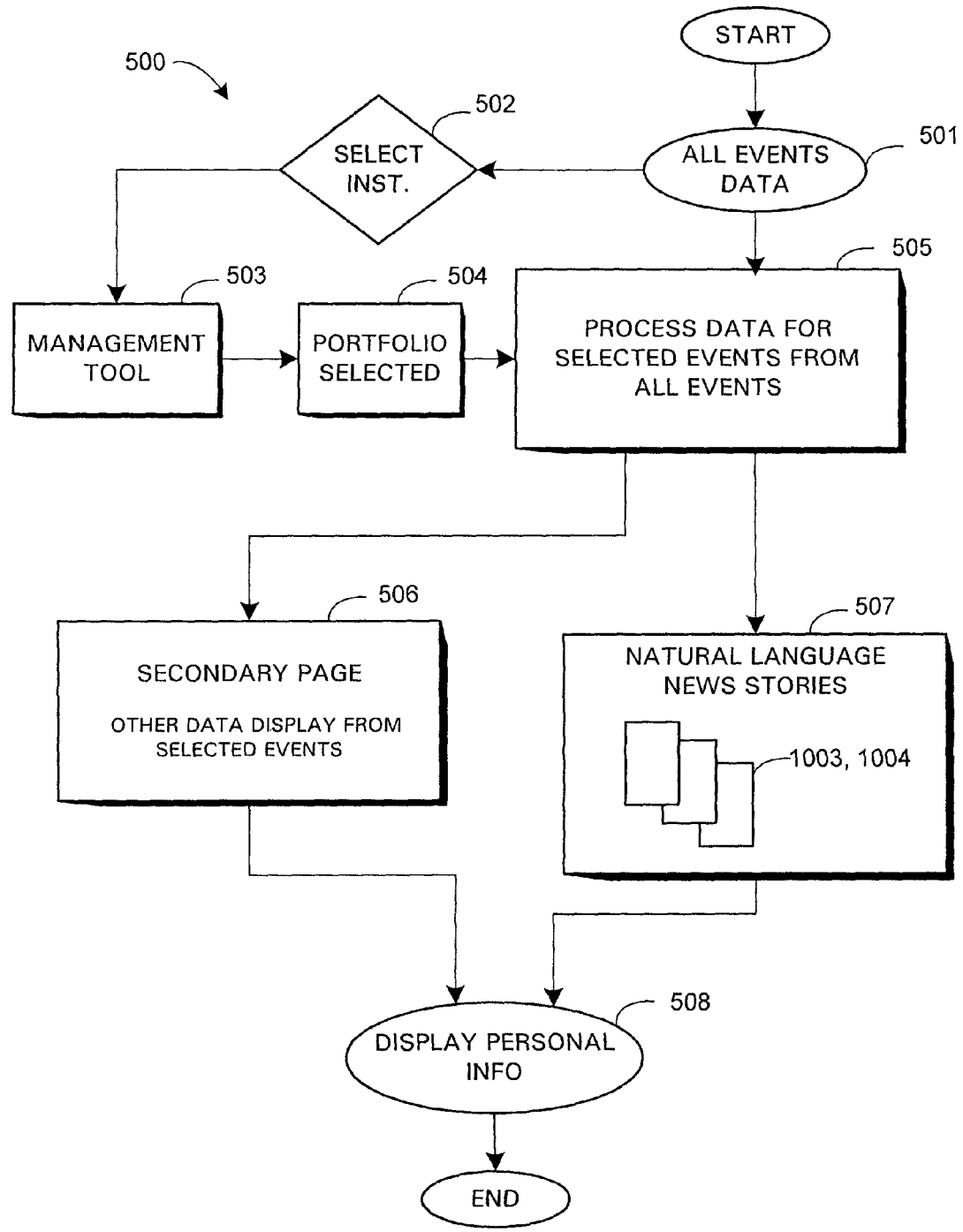
FIG. 9 is a schematic diagram of the method for generating natural language news-based stories relating to selected events held in a portfolio according to a first embodiment of the present disclosure.

The system will then produce at the request of the use either a secondary page 506 to be displayed that includes only the data from the selected events from the portfolio 504 (in the sports example tables with statistics and in the auction example the prices and list of items for sale) or the system 505 will produce natural language news stores 1003 or 1004 for each or a portion of the selected events 504. As shown at FIG. 9, the stories 1003, 1004 are displayed at a personal display 508 as described with greater detail at FIG. 12.

Figures 10, 11:
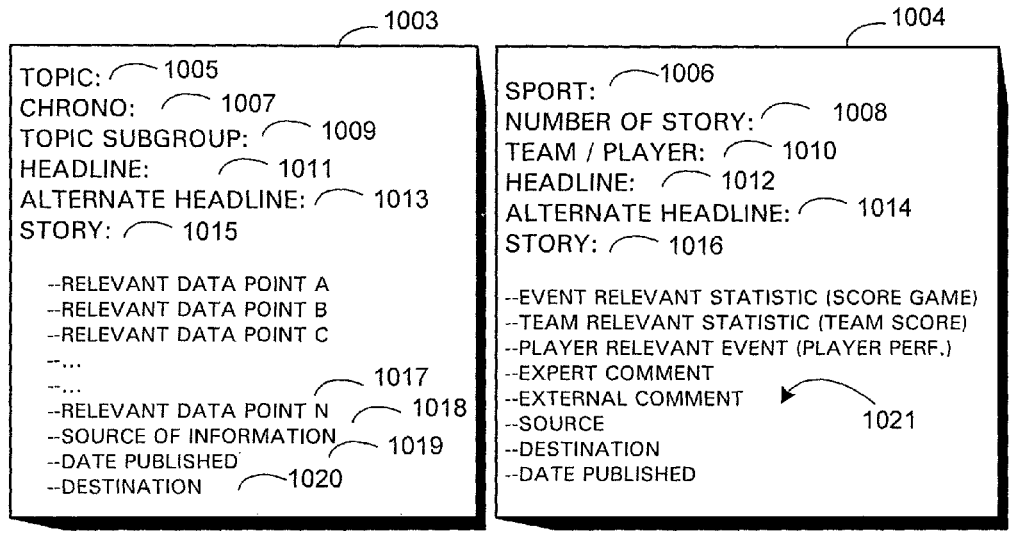
FIG. 10 is a schematic diagram of the automatically generated natural language news-based story as shown in FIG. 9 for different topics.
FIG. 11 is a schematic diagram of the automatically generated natural language news-based story as shown in FIG. 9 for different sports events.

FIGS. 10 and 11 show the different elements that can be found as part of each of the natural language news stories produced as described fully above. For each news there may be a topic 1005, a chrono 1007 indicating the number or list value of the story, a subgroup 1009 for example the team within a division, or a player in a team selected 1010, a headline for the story 1011, 1012, an alternate headline 1013, 1014, and a story 1015, 1016. The story as created above via the natural language system relies on several relevant data points 1017, a source of information 1018, the date relative to the event 1019 and some location parameter 1020.

In the case of a sports related natural language news story 1004, the news story 1016 can include as part of the body 1021 relevant event statistics such as the score of a game, a team relevant statistic for example the score of a team, some player relevant information, expert comments, external comments, and source, destination and dating. Once again the creation of a natural language news stories is shown as part of a method for generating these stories and a system associated thereto.

Figure 12:
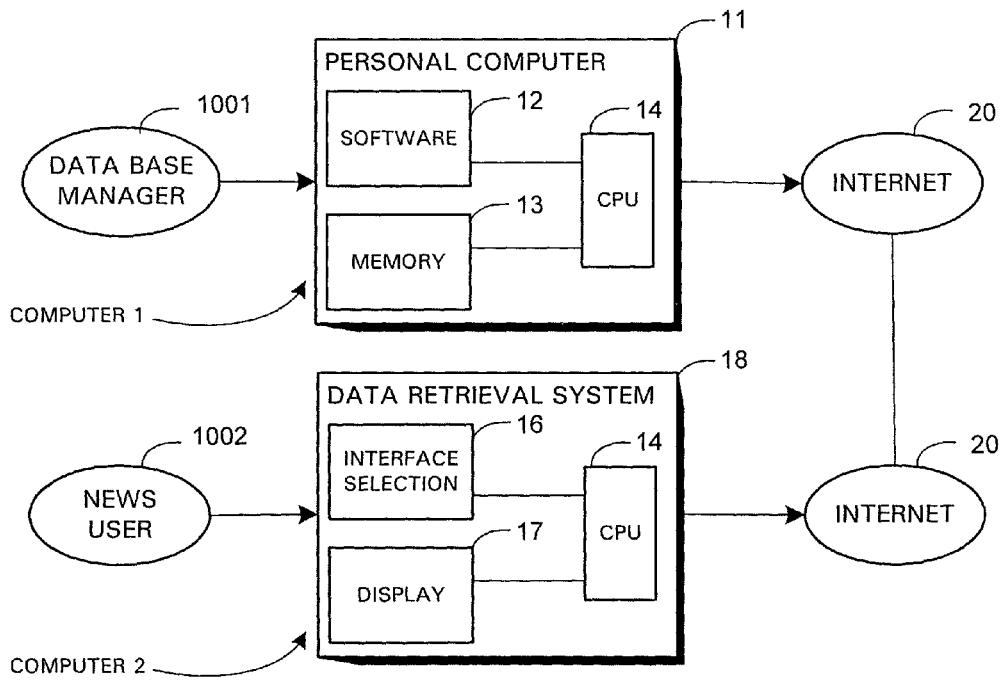
FIG. 12 is an overview of the system for generating natural language news-based stories relating to financial instruments held in a portfolio according to another embodiment of the present disclosure.

What is show is a method for generating natural language news-based stories 1003, 1004 as part of a display 508 with a plurality of natural news-based stories 507, the method comprising the steps of selecting process data for a selected portfolio 502 of events from a plurality of events 501 using a computer interface as shown at FIG. 12. Further offering a choice on the computer interface between creating a secondary page 506 where the process data is displayed or creating 507 a news stories page each produced from the events selected in the portfolio 504 and displaying the selected information. As described above, the news stories page comprises a plurality of natural language news stories, each including a date of publication, a story rewritten in natural language using a template from a news brief with a news-generating algorithm with sentence and paragraph reconstruction to simulate natural language selected from a plurality of templates each with input variables and at least a data field, and a source of origin for the news brief.

In one further embodiment, the step of selecting the portfolio 504 is preceded by the step of using a management tool 503 to define the portfolio and where this tool 503 includes a selection 502 of topics or subgroups from a group of pre-defined choices consisting for example of 1021 of user entry favorites such as the choice by a user of teams that are liked, expert favorites for example a list of teams that a specific channel or former player may enjoy watching, events in the news that hit the wire at a specific time such as during a Monday night football game period, time sensitive topics such as all of the games that resulted in last minute points, related news line items, or topics with a common indexing factor such as for example all games where a specific weather condition occurred.

What is also disclosed is a system for generating natural language news-based stories of events held in a portfolio, the system including a computer 11 as shown at FIG. 12 connected to an Internet 20, the computer with a memory 13 and a central processing unit 14 in functional communication with the memory 13, and a software 12 executed by the central processing unit 14 in the memory 13, the software 12 being used to selectively execute either a secondary page 506 or a news report 507 with a plurality of natural language news stories 1003, 1004 for a plurality of events 504 held in a portfolio as defined by a portfolio manager 503, and a data retrieval system 18 connected to the Internet 20 in data connection with the computer 11, with a user interface 1002, a central processing unit 14 connected to the user interface, and a display 17, where the software 12 generates the news report 507 based on a news brief for a plurality of events 505 in the portfolio 504, and where the data retrieval system 18 retrieves either the secondary page 506 or the news report 507 from the personal computer 11 via the Internet 20 for display 17 to the portfolio user 1002.

It is understood that the preceding description is merely a detailed description of some examples and embodiments of the present invention and that numerous changes to the disclosed embodiments can be made in accordance with the disclosure herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A method of generating natural language news-based stories as part of a display with a plurality of natural news-based stories, the method comprising the steps of:

using a management tool to select items of interest within an event data database to create a portfolio made from the items of interest;

selecting data of the portfolio from the items of interest using a computer interface, wherein some data is in numerical format;

offering a choice on the computer interface between creating a strategies page where the data is displayed in the numerical format as part of the strategies page or creating a natural language news stories page where the data is displayed as part of a plurality of natural language news stories, wherein the natural language news stories as part of the natural language news stories page each including a date of publication, a story rewritten in natural language using a template from a news brief with a news-generating algorithm with sentence and paragraph construction to simulate natural language from the numerical format data selected from a plurality of templates each with input variables and at least a data field from the data, and a source of origin of the news brief, wherein the algorithm with sentence and paragraph reconstruction includes a series of boilerplate sentences varied using a parsing table; and creating and displaying either the strategies page or the natural language news stories page to a portfolio user.

2. The method of claim 1, wherein the algorithm with sentence and paragraph reconstruction to simulate natural language include any one of the list: merging information, removing irrelevant data, conforming dates for convenience, conforming dates for consistency.

3. The method of claim 1, wherein the items of interest are selected from a group consisting of investment instruments, sports journalism, hotel location, travel data, automated daily recap of items on a wish list in an auction, selection of retail product families, daily activity breakdown of friends posts on social media, daily reports on search engines, marketing program promotions.

4. The method of claim 1, wherein the data is selected from a group consisting of a number of records, a number of records, an investment symbol, a headline, an alternate headline, a story, a topic, a chrono, a sport, a number of stories, a team, and a player.

5. A system of generating natural language news-based stories of items of interest held in a portfolio, the system comprising:

a computer connected to an Internet, wherein the computer comprising a memory and a central processing unit in functional communication with the memory, and a software executed by the central processing unit in the memory, wherein the software being used to selectively execute either a strategies page or a natural language news stories page with a plurality of natural language news stories of a plurality of items of interest held in a portfolio as defined by a management tool of the selection of items of interest; and a data retrieval system connected to the Internet in data connection with the computer, with a user interface, a central processing unit connected to the user interface, and a display, wherein the software generates either a strategies page or a natural language news stories page based on data from each of a plurality of items of interest in the portfolio, wherein each natural language news story as part of the natural language news stories page includes a date of publication, a news item rewritten in natural language using a template from a news brief using an news-generating algorithm with sentence and paragraph construction to simulate natural language from a partly numerical format data selected from a plurality of templates each with input variables and at least a data field from the data, and wherein the data retrieval system retrieves either the strategies page or the natural language news stories page from the personal computer via the Internet, wherein the algorithm with sentence and paragraph construction includes a series of boilerplate sentences to be repeated, and wherein terms part of the boilerplate sentences are varied using a parsing table.

6. The system of claim 5, wherein the algorithm with sentence and paragraph reconstruction to simulate natural language include any one of the list: merging information, removing irrelevant data, conforming dates of convenience and consistency.

7. The system of claim 5, wherein the items of interest are selected from a group consisting of investment instruments, sports journalism, hotel location, travel data, automated daily recap of items on a wish list in an auction, selection of retail product families, daily activity breakdown of friends posts on social media, daily reports on search engines, marketing program promotions.

8. The system of claim 5, wherein the data is selected from a group consisting of a number of records, a number of records, an investment symbol, a headline, an alternate headline, a story, a topic, a chrono, a sport, a number of stories, a team, and a player.

9. A system of generating natural language news-based stories of events held in a portfolio, the system comprising:

a computer connected to an Internet, wherein the computer comprising a memory and a central processing unit in functional communication with the memory, and a software executed by the central processing unit in the memory, wherein the software being used to selectively execute a news report a plurality of natural language news stories of a plurality of items of interest held in a portfolio as defined by a portfolio manager, wherein the natural language news stories page comprises a plurality of natural language news stories, each including a date of publication, a story rewritten in natural language using a template from a news brief with a news-generating algorithm with sentence and paragraph construction to simulate natural language from a partly numerical format data selected from a plurality of templates each with input variables and at least a data field from a data selected from the items of interest in the portfolio, and a source of origin of the news brief, and wherein some of the data is numerical and used by the news-generating algorithm to simulate natural language, wherein the algorithm with sentence and paragraph construction includes a series of boilerplate sentences to be repeated, and wherein terms part of the boilerplate sentences are varied using a parsing table.

10. The system of claim 9, wherein the algorithm with sentence and paragraph reconstruction to simulate natural language include any one of the list: merging information, removing irrelevant data, conforming dates of convenience and consistency.

11. The system of claim 9, wherein the items of interest are selected from a group consisting of investment instruments, sports journalism, hotel location, travel data, automated daily recap of items on a wish list in an auction, selection of retail product families, daily activity breakdown of friends posts on social media, daily reports on search engines, marketing program promotions.

12. The system of claim 9, wherein the data is selected from a group consisting of a number of records, a number of records, an investment symbol, a headline, an alternate headline, a story, a topic, a chrono, a sport, a number of stories, a team, and a player.

* * * * *